United States Patent
Christodorescu et al.

(10) Patent No.: US 9,251,328 B2
(45) Date of Patent: *Feb. 2, 2016

(54) USER IDENTIFICATION USING MULTIFACETED FOOTPRINTS

(75) Inventors: Mihai Christodorescu, Yorktown Heights, NY (US); Reiner Sailer, Yorktown Heights, NY (US); Douglas Lee Schales, Yorktown Heights, NY (US); Marc Stoecklin, Yorktown Heights, NY (US); Ting Wang, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 779 days.

This patent is subject to a terminal disclaimer.

(21) Appl. No.: 13/553,415

(22) Filed: Jul. 19, 2012

(65) Prior Publication Data

US 2014/0012976 A1    Jan. 9, 2014

Related U.S. Application Data

(63) Continuation of application No. 13/542,422, filed on Jul. 5, 2012, now Pat. No. 9,003,025.

(51) Int. Cl.
G06F 15/173    (2006.01)
G06F 21/32    (2013.01)
H04L 12/24    (2006.01)

(52) U.S. Cl.
CPC ........ *G06F 21/32* (2013.01); *G06F 2221/2101* (2013.01); *G06F 2221/2117* (2013.01); *H04L 41/5058* (2013.01); *H04L 41/5096* (2013.01)

(58) Field of Classification Search
CPC ............ G06F 21/32; G06F 2221/2117; G06F 2221/2101; H04L 41/5058; H04L 41/5096
See application file for complete search history.

(56) References Cited

U.S. PATENT DOCUMENTS

| | | | |
|---|---|---|---|
| 9,003,025 B2 * | 4/2015 | Christodorescu et al. | .... 709/224 |
| 2008/0098220 A1 | 4/2008 | Spalink et al. | |
| 2009/0249480 A1 | 10/2009 | Osipkov et al. | |
| 2010/0076813 A1 | 3/2010 | Ghosh et al. | |
| 2011/0087647 A1 | 4/2011 | Signorini et al. | |
| 2011/0246520 A1 | 10/2011 | Koister et al. | |
| 2013/0288656 A1 | 10/2013 | Schultz et al. | |

FOREIGN PATENT DOCUMENTS

CN    101753341    6/2010

OTHER PUBLICATIONS

English Abstract for Publication No. CN101753341.

* cited by examiner

*Primary Examiner* — Yves Dalencourt
(74) *Attorney, Agent, or Firm* — F. Chau & Associates, LLC

(57) ABSTRACT

A method for identifying an unknown user according to a plurality of facets of user activity in a plurality of contexts includes receiving a plurality of priors for the facets with respect to the contexts, receiving a plurality of footprints of known users, aggregating the footprints of the users to determine an ensemble prior, receiving a plurality of network traces relevant to an unknown user in a computer environment, matching the network traces against each of the footprints to determine a plurality of matches, aggregating the matches using the ensemble prior according to the facets and the contexts, and outputting a probable user identity for the unknown user.

13 Claims, 4 Drawing Sheets

USER IDENTIFICATION USING MULTIFACETED FOOTPRINTS

CROSS-REFERENCE TO RELATED APPLICATION

This is continuation application of U.S. application Ser. No. 13/542,422, filed Jul. 5, 2012, the disclosure of which is herein incorporated by reference in its entirety.

BACKGROUND

1. Technical Field

The present disclosure generally relates to user identification, and more particularly, to identifying a true identity of a system user.

2. Discussion of Related Art

Identifying a system user's true identity has a history as long as that of cyber security itself. In its simplest form, credential-based (e.g., password) verification is used as the de facto solution; therefore exposure of a user's credential(s) is considered a severe security breach. Several lines of work have been proposed in attempt to ameliorate this problem by re-identifying users using information beyond the user's credential.

BRIEF SUMMARY

According to an embodiment of the present disclosure, a method for identifying a user according to a plurality of facets of user activity in a plurality of contexts includes receiving a plurality of priors for the facets with respect to the contexts, receiving a plurality of footprints of known users, aggregating the footprints of the users to determine an ensemble prior, receiving a plurality of network traces relevant to an unknown user in a computer environment, matching the network traces against each of the footprints to determine a plurality of matches, aggregating the matches using the ensemble prior according to the facets and the contexts, and outputting a probable user identity for the unknown user.

According to an embodiment of the present disclosure, a method for identifying a user includes providing a plurality of historical network traces of user activity, extracting a footprint for each of a plurality of users from the historical network traces, aggregating the footprints of the users to determine an ensemble prior, receiving a plurality of network traces relevant to an unknown user in a computer environment, matching the network traces against each of the footprints to determine a plurality of matches, aggregating the matches using the ensemble prior according to a plurality of contexts and a plurality of facets, and outputting a probable user identity for the unknown user.

A system for identifying an unknown user according to a plurality of facets of user activity in a plurality of contexts, wherein the system includes a memory storing a plurality of priors for the facets with respect to the contexts and an ensemble prior based on a plurality of footprints of known users, and a processor configured to receive a plurality of network traces relevant to an unknown user in a computer environment, match the network traces against each of the footprints to determine a plurality of matches, aggregate the matches using the ensemble prior according to the facets and the contexts, and output a probable user identity for the unknown user.

BRIEF DESCRIPTION OF THE SEVERAL VIEWS OF THE DRAWINGS

Preferred embodiments of the present disclosure will be described below in more detail, with reference to the accompanying drawings.

DETAILED DESCRIPTION

According to an embodiment of the present disclosure, an identification solution may acquire a behavioral pattern for a user extracted from network traces. The behavioral pattern is a "footprint" of the user. Herein, extracted identifiable features may be referred to "fingerprints."

The fingerprints may be based on high-level user information observable from the effect of user activity on a network interface. The monitoring of a user's network traces is generally feasible due to its less intrusive nature and widely deployed network monitoring infrastructures. Moreover, the deployment of monitoring is fairly flexible; client, gateway, or server can all be equipped with a monitoring capability. Furthermore, monitoring may be deployed at different layers of the network stacks such that network traces may be available in a variety of forms, e.g., DNS queries, HTTP requests, and Netflow measures, reflecting the user's network behavior from different "facets", e.g., visited IP addresses/ports, flow size, and flow elapse time.

While it may be difficult to attribute a single network event to a particular individual (without instrumental support), a set of network events may be attributed to an individual user in a given pool (e.g., users in an enterprise). This result is particularly useful for network forensics, wherein the identity of user is typically unavailable, and thus conventional anomaly detection tools are inapplicable.

According to an embodiment of the present disclosure, an exemplary network trace-based user re-identification method is disclosed for leveraging network monitoring data while working around its constraints. The exemplary method includes a network trace based user identification framework. On a first tier of the framework, the method may apply discriminative models to encode user and context-sensitive footprints in each facet. On a second tier of the framework, the method may adaptively combine the footprints from multiple facets and achieve provable identification accuracy, even when facing mimicry attack Embodiments of the method may use a new class of discriminative models for capturing user and context sensitive footprints. Embodiments of the method may include a learning method for extracting the footprints from noisy historical traces. Embodiments of the method include online footprint matching. An exemplary implementation of the method is described for an adaptive ensemble scheme, combining the matching results from multiple facets, which overcomes the weak distinguishing power of each individual facet.

Figure 1:
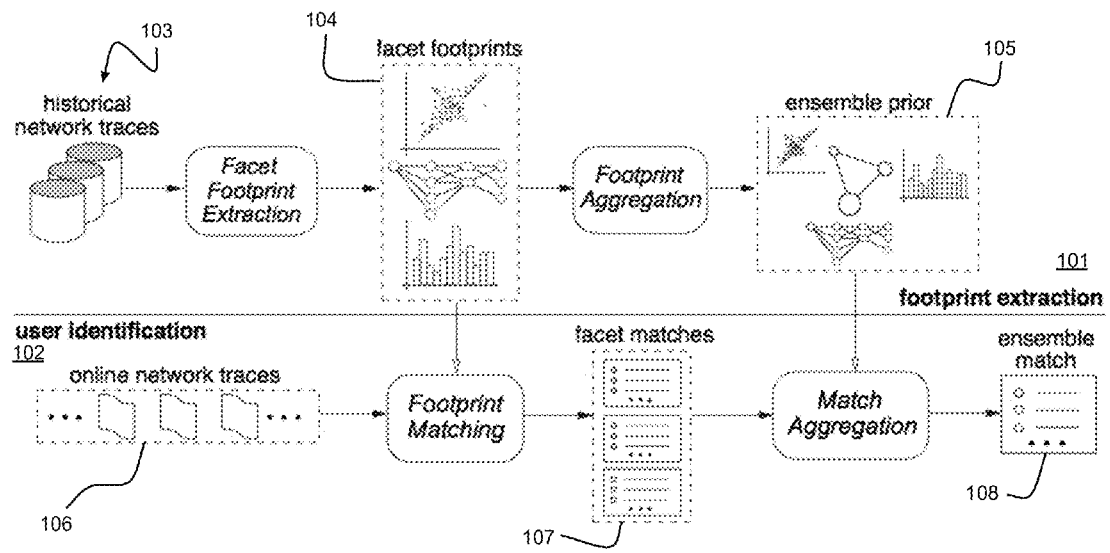
FIG. 1 is architecture of network trace-based user re-identification system according to be an embodiment of the present disclosure.

Referring now to FIG. 1, a user re-verification framework for a network trace-based user re-identification is shown. FIG. 1 depicts an overall architecture, which comprises (offline) footprint extraction 101 and (online) user identification 102.

In the footprint extraction component 101, for each network facet, supervised learning methods automatically extract a user's statistical profile from historical network traces 103 (e.g., training data). A discriminative model may be used to encode the user's statistical profile as the user's "facet footprint" 104. By studying the statistical performance of these facet footprints in identifying a specific user in training data, a parameterization (e.g., Maximum Likelihood) of aggregating these facet footprints may be learned 105, which is termed the "ensemble prior".

The user identification component 102 includes footprint matching and ranking aggregation. A set of network traces 106 derived from multiple facets may be submitted as a query. The network traces may be generated by an unknown user. For each facet, the network traces may be matched against a corresponding facet footprint of the users in the pool. A ranked list of candidate user identities (facet ranking) 107 may be output in terms of their posterior probability of being responsible for generating the traces. Using a model ensemble scheme, these facet matching results may be aggregated into an ensemble match 108 (in the sense of Maximum Likelihood) using the ensemble prior from the footprint extraction component 101 as the prior. The ensemble match 108 may rank the most probable user identities.

If the set of most probable user identities in the ranked list are associated with high probabilities, the true user identity may be considered to be among these top candidates; otherwise the identity may be considered as unidentifiable due to either suspicious user behavior or insufficient identification information. An unidentifiable identify may prompt further investigation mechanisms.

According to an embodiment of the present disclosure, the network trace-based user re-identification uses a footprint, which intuitively captures a user's behavioral pattern as observable from network traces. A footprint model may consider a variety forms of network traces, including HTTP headers, Netflow measures, and DNS queries. Referring to the HTTP headers, which are the message headers of a request or response in the Hypertext Transfer Protocol, request headers may be used when capturing the behavior of a user. Netflow is a network protocol that collects IP traffic information, including inbound/outbound flow size and elapse time. The Domain Name System (DNS) maps domain names to IP addresses. A DNS query looks up the IP address for a domain name. The facet unifies the processing of these data forms.

Definition 1 (Facet). A facet is the measurement of a particular dimension of a user's network behavior as reflected in the collected network traces.

For example, an exemplary set of facets are listed in Table 1 (the information of source IP address/port has been replaced by " . . . ).

TABLE 1

Relevant facets of HTP requests, Netflow records, and DNS queries

| network trace | facet | example |
| --- | --- | --- |
| HTTP request | Domain name | www . . . com |
| Netflow measure | IP address, port, flow traffic size, flow elapse time | . . . , 22, 2048 octets 1024 milliseconds |
| DNS query | Domain name | www . . . com |

Besides the facets where user network behavior is observed, the context in which the use network behavior has been generated may also be considered. In an exemplary implementation, the context information is considered including a time period (e.g., 2:00-4:00 PM) and client operating system (OS), while it will be shown that other context information can be readily incorporated.

For the training data (historical network traces), two mappings are accessible. The first mapping is the DHCP logs that map an IP address (source) at a given time point to the corresponding device (its MAC address). The second mapping is the user authentication logs that map a device (its MAC address) at a given time point to the operating user's credential. With these mappings, the network traces may be attributed to the corresponding users and devices.

Combining the information above, the following data model may be considered.

Definition 2 (Data Model). Assume a finite pool of known users U and a finite set of contexts C. For a given facet of network trace, each record is abstracted as a tuple $\langle u, c, t \rangle$, where u∈U and c∈C denote the user and context, respectively, and t is a token from a finite token set T specific to that facet. Note that in this model the four facets (destination IP, port, traffic size, and elapse time) of the Netflow measure are treated individually and are split into four tuples.

For simplicity of presentation, it may be assumed that for each facet all tuples with same user u and context c are grouped into a summary tuple $\langle u, c, t \rangle$ where t denotes the multi-set of the tokens in these tuples.

Turning now to a model encoding the user network footprint, a footprint model may (i) differentiate individual characteristic behavioral patterns of a user from the user population; (ii) reflect the context-sensitive nature of user network behavior; (iii) support learning and evaluation for the dataset.

The footprint model is context-aware and discriminative. For purposes of presentation, the data of HTTP request header is used as a concrete example to illustrate the model. It should be understood that the model may be generalized to other datasets.

Assume that the network traces of a user reflect a set of latent activities (e.g., browsing news, reading emails, social networking). More formally, assume that for a given facet of network traces collection $\mathcal{T}$; each combination (u,c) of user u and context c corresponds to a multinomial distribution over a finite set of latent activities A, indicating the tendency of user u to perform each activity under context c; each activity a∈A corresponds to a multinomial distribution over the set of tokens T, indicating its tendency to generate each token; each token is associated with a latent activity, and is independently generated.

Definition 3 (Footprint). The footprint of user u under context c comprises the conditional probability p(u|c) (indicating u's tendency to perform under c) and the multinomial distribution $\{p(a|u, c)\}_{a \in A}$ over the set of activities (indicating u's tendency to perform each activity under c).

The computation of the conditional probability $\{p(u|c)\}$ (in the sense of Maximum Likelihood) from training data may be given by:

$$p(u|c) = \frac{\sum_t n(u, c, t)}{\sum_t \sum_{u'} n(u', c, t)}$$

where n (u,c,t) is the number of times user u generates token t (e.g., u visits domain name t in the case of HTTP traces) under context c in the historical network traces.

Figure 2:
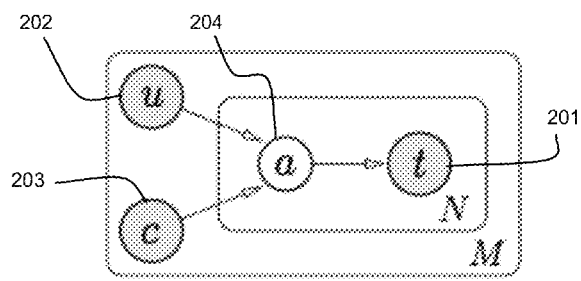
FIG. 2 is a plate diagram of context-aware, discriminative model according to be an embodiment of the present disclosure.

To $\{p(a|u, c)\}_a$, the model defines a generative process as follows: given user u and context c, select an activity a with probability p(a|u, c), and generate token t with probability p(t|a). As shown in FIG. 2, the conditional probability of an observed token t 201 given user u 202 and context c 203 can be determined by summing out the latent activity 204:

$$p(t|u, c) = \sum_{a \in A} p(t|a) p(a|u, c)$$

For a multi-set of tokens t, given the independency of token generation, $p(t|u,c) = \Pi_{t \in t} p(t|u,c)$. The graphical representation of the generative model is shown in FIG. 2. As shown in FIG. 2, the model makes explicit representation of context information 203.

Following the Maximum Likelihood (ML) principle, p(a|u,c) and p(t|a) may be determined by maximizing the following log-likelihood of the collection of traces $\mathcal{T}$:

$$L(\mathcal{T}) = \sum_u \sum_c \sum_t n(u, c, t) \log \sum_a p(t|a) p(a|u, c) \quad (1)$$

Referring to user discrimination and context awareness, an exemplary network trace-based user re-identification method attempts to maximize user discrimination and incorporate context information.

In the footprint model presented above, a user's latent activity may be learned in a user-context-agnostic manner, e.g., the user and context variables are treated as "dummy" indices.

A regularizer component may be added to the log-likelihood model. In this component, discrimination between different users may be maximized and context correlation may be incorporated. More specifically, the maximization of the separation of probability distributions of different users may be formalized as:

$$\max \sum_{u \neq u'} \sum_c \sum_a (p(a|u, c) - p(a|u', c))^2 \quad (2)$$

Simultaneously, the semantic correlation of different contexts may be leveraged to regularize the model. Here, it may be assumed that the same user in "similar" contexts should behave similarly, i.e., $\{p(a|u, c)\}$ and $\{p(a|u,c')\}_a$ should be proximate if contexts c and c' are similar. The local geometric structures of a scatter of data points can be approximated by their nearest neighbor graph, and according to an embodiment of present disclosure, the proximity of contexts may be modeled using a context network model.

Definition 4 (Context Network). A context network $G_C$ is a graph in which each context is represented as a node, and two nodes c, c'∈C are adjacent via an undirected edge c-c' if context c (c') appears in the set of d nearest neighbors of context c'(c). A weight w(c,c')(0<w(c,c')≤1) may be specified to indicate their proximity, with "0" meaning irrelevant and "1" identical.

Figure 3:
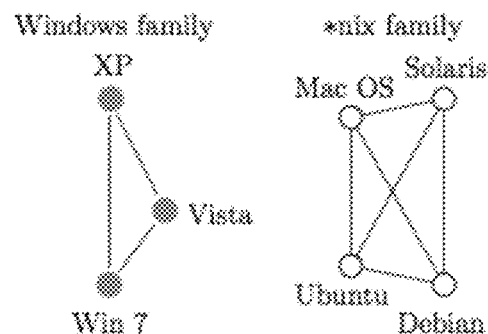
FIG. 3 is an exemplary context network according to be an embodiment of the present disclosure.

An example of context network is shown in FIG. 3, which captures the semantic proximity between a set of operating system platforms.

Instead of directly minimizing the separation of the distributions $\{p(a|u,c)\}$ and $\{p(a|u,c')\}$ of user u under proximate contexts c and c', an alternative formalization may be considered:

$$\max \sum_{c \sim c'} \sum_u \sum_a (1 - w(c, c'))(p(a|u, c) - p(a|u, c'))^2 \quad (3)$$

To incorporate the objectives of Eq. (2) and Eq. (3) into a unified representation, the concept of Cartesian product network may be used.

Definition 5 (Cartesian Product Network). For two networks $G_U = (V_U, E_U)$ and $G_C = (V_C, E_C)$, their Cartesian product network is defined as a graph $\mathcal{G} = (V,E)$ such that node v=(u, c)∈V if u∈$V_U$ and c∈$V_C$, while there exists an edge v-v' if (u=u' and c-c'∈$E_C$) or (u=u'∈$E_C$ and c=c').

Figure 4:
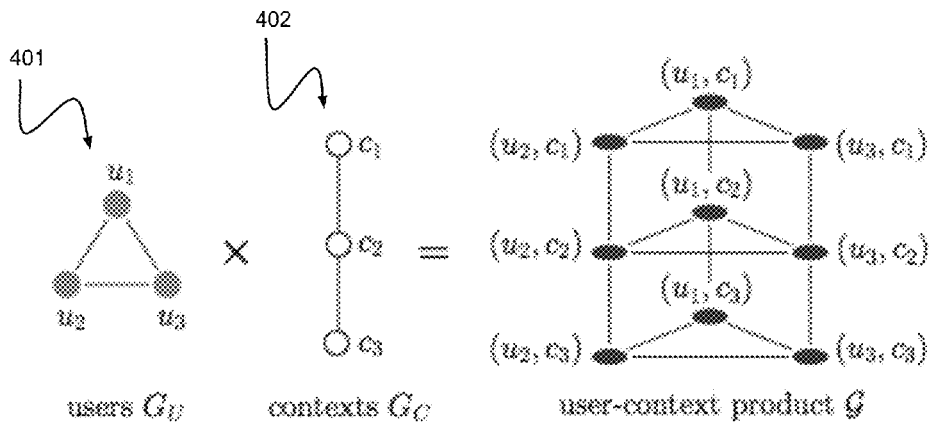
FIG. 4 is an example of a user-context product network, as multiplied by user network and context network according to be an embodiment of the present disclosure.

In our case we specify user network $G_U$ as a complete graph, i.e., every pair of users are adjacent. By "multiplying" user network $G_U$ and context network $G_C$, we obtain the user-context product $\mathcal{G}$. An example for three users ($u_1$, $u_2$ and $u_3$) 401 and three contexts ($c_1$, $c_2$ and $c_3$) 402 is shown in FIG. 4.

In $\mathcal{G}$ the weight of edge vv' may be specified as follows. Let v=(u,c) and v=(u', c') be two nodes in $\mathcal{G}$. If c=c', w(e, e')=1; otherwise w(v,v')=α(1−w(c,c')). Here α is a parameter that balances Eq. (2) and Eq. (3). If v and v' are not adjacent, we set w(v,v)=0.

By incorporating Eq. (2) and Eq. (3) into the basic log likelihood Eq. (1), the problem of footprint extraction may be reformulated as maximizing the following objective function (here, substitute the combination (u,c) with v):

$$O(\mathcal{T}, \mathcal{G}) = L(\mathcal{T}) + \lambda R(\mathcal{T}, \mathcal{G})$$
$$= \sum_v \sum_t n(v, t) \log \sum_a p(t|a) p(a|v) +$$
$$\lambda \sum_{v \neq v'} \sum_a w(v, v')(p(a|v) - p(a|v'))^2$$

where λ is the regularization parameter. It can be verified that the regularizer R(T, G) entails both Eq. (2) and Eq. (3).

In the special case of λ=0, the objective function degenerates to a formation of pLSA without regularization. One method of parameter estimation for pLSA is the Expectation Maximization (EM) method, which determines a (local) maximum of the log-likelihood $L(\mathcal{T})$. It iterates between E-step and M-step: in E-step, it determines the expectation of the complete likelihood $Q(\Psi; \Psi_n)$, where Ψ denotes all the parameters and Ψn represents the estimated parameters in the n-th iteration; in M-step, it updates the parameter estimation $\Psi_{n+1}$ for the (n+1)-th iteration by maximizing $Q(\Psi; \Psi_n)$ as: $\Psi_{n+1} = \arg\max_\Psi Q(\Psi; \Psi n)$.

Known Expectation-Maximization (EM) methods for pLSA may be extended to evaluate the parameters for the context-aware, discriminative model. More formally, an Expectation, or E-step, determines the conditional distribution of the latent activities given the collection of traces and the estimated parameters in the previous iteration (here $p_n(\bullet)$ denotes the estimated probabilities for the n-th iteration), which is similar to that in pLSA:

$$p(a|v, t) = \frac{p_n(t|a)p_n(a|v)}{\sum_{a' \in A} p_n(t|a')p_n(a'|v)} \quad (4)$$

In the Maximization, or M-step, the following lower bound of expected log-likelihood may be considered (here the parts of Lagrange multipliers corresponding to the constraints of parameters have been omitted):

$$\sum_a p(a|v) = 1 \text{ and } \sum_a p(t|a) = 1):$$

$$Q(\Psi; \Psi_n) = \sum_v \sum_t n(v,t) \sum_a p(a|v,t)\log(p(t|a)p(a|v)) + \lambda \sum_{v \neq v'} \sum_a w(v,v')(p(a|v) - p(a|v'))^2.$$

It can be observed that $\{p(t|a)\}$ does not rely on the regularization term; therefore, the re-estimation of $p(t|a)$ has a closed form as in pLSA:

$$p_{n+1}(t|a) = \frac{\sum_v n(v,t)p(a|v,t)}{\sum_v \sum_{t' \in T} n(v,t')p(a|v,t')} \quad (5)$$

No closed form of re-estimation exists for $p_{n+1}(a|v)$. A generalized EM method (GEM) may be used, which instead of searching for the local maximum of $Q(\Psi;\Psi n)$ at every M-step, finds $\Psi_{n+1}$ that leads to $Q(\Psi_{n+1}; \Psi_n) \geq Q(\Psi_n;\Psi_n)$. More specifically, starting with $\Psi_{n+1}=\Psi_n$, the GEM method may be applied on $R(\mathcal{T}, \mathcal{G})$ once to update $\psi_{n+1}$, then update $\psi_{n+1}$ using the following exemplary rule:

$$p_{n+1}^{new}(a|v) = (1-\gamma)p_{n+1}^{old}(a|v) + \gamma \frac{\sum_{v \sim v'} w(v,v')p_{n+1}^{old}(a|v')}{\sum_{v \sim v'} w(v,v')}$$

Here, $\Sigma_a p_{n+1}^{new}(a|v)=1$ and $p_{n+1}^{new}(a|v) \geq 0$. A series of $\Psi_{n+1}$ may then be generated and tested until $Q(\Psi_{n+1}; \Psi_n)$ decreases.

Figure 5:
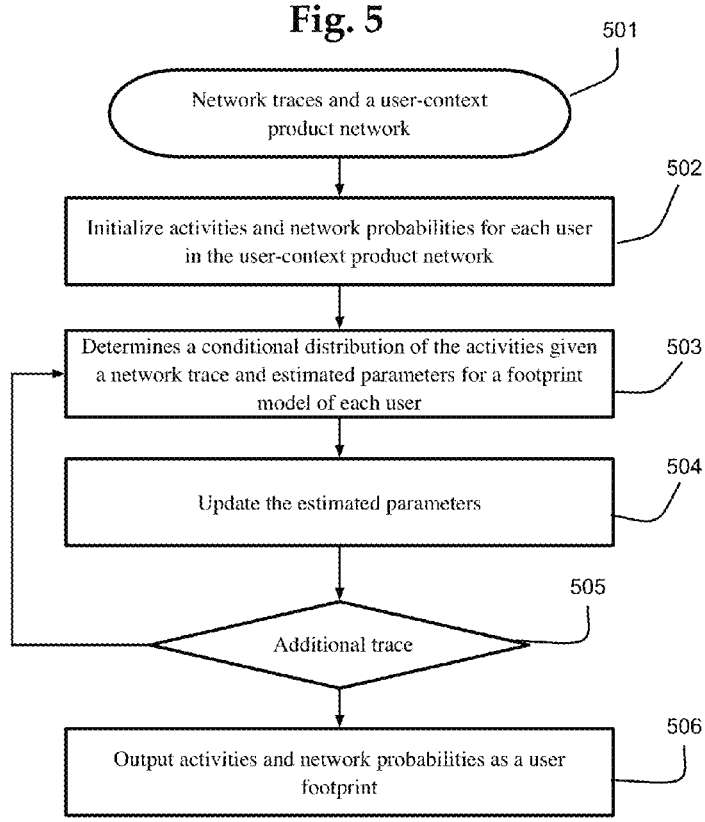
FIG. 5 shows an exemplary a method for footprint extraction according to an embodiment of the present disclosure.

An exemplary method of parameter estimation is depicted in FIG. 5. In FIG. 5, a collection of network traces $\mathcal{T}$ and a user-context product network $\mathcal{G}$ are given 501. The method initializes $\{p_n(t|a)\}$ and $\{p_n(a|v)\}$ at block 502. For each trace 505 the method determines a conditional distribution of the activities given a network trace and estimated parameters for a footprint model of each user 503 and updates the estimated parameters 504. The method outputs a set of extracted footprints $\{p(a|v)\}$ and $\{p(t|a)\}$ for each $v \in \mathcal{G}$ 506.

Once the statistical characteristics of the users' behaviors (i.e., footprints) are learned, (i) the behavior of unknown users may be matched with footprints and (ii) the matching results from multiple facets may be used to improve the accuracy of identifying the unknown user.

Referring to the single facet, single context, start with a simple case where the network traces are generated from a single network facet under a single context. That is, given the observed network traces $\langle u^*, c, t\rangle$ relevant to an unknown user $u^*$, find the users with the most similar behavior to $u^*$ in the pool of known users U, for example, by folding-in the traces into the space of latent activities. More specifically:

E-step:

$$p(a|u^*, c, t) = \frac{p(t|a)p(a|u^*, c)}{\sum_{a' \in A} p(t|a')p(a'|u^*, c)} \quad (6)$$

M-step:

$$p(a|u^*, c) = \frac{\sum_{t \in t} n(t, u^*, c)p(a|u^*, c, t)}{\sum_{a' \in A}\sum_{t' \in t} n(u^*, c, t')p(a'|u^*, c, t')} \quad (7)$$

where $\{p(t|a)\}$ are kept fixed.

Using a Kullback-Leibler divergence to measure the distance of the footprints of $u^*$ and each user a in the pool U, the determination of the divergences for all the known users can be transformed as one matrix-vector multiplication, with the complexity $O(|U||A|)$. Moreover, if only the most likely user is sought, indexing structures may be used, such as a label embedding tree, which reduces the complexity to $O(|A|\log|U|)$. Following let $K_c^f(u,u^*)$ denote the rank of u in the ascending order of the divergence.

Figure 6:
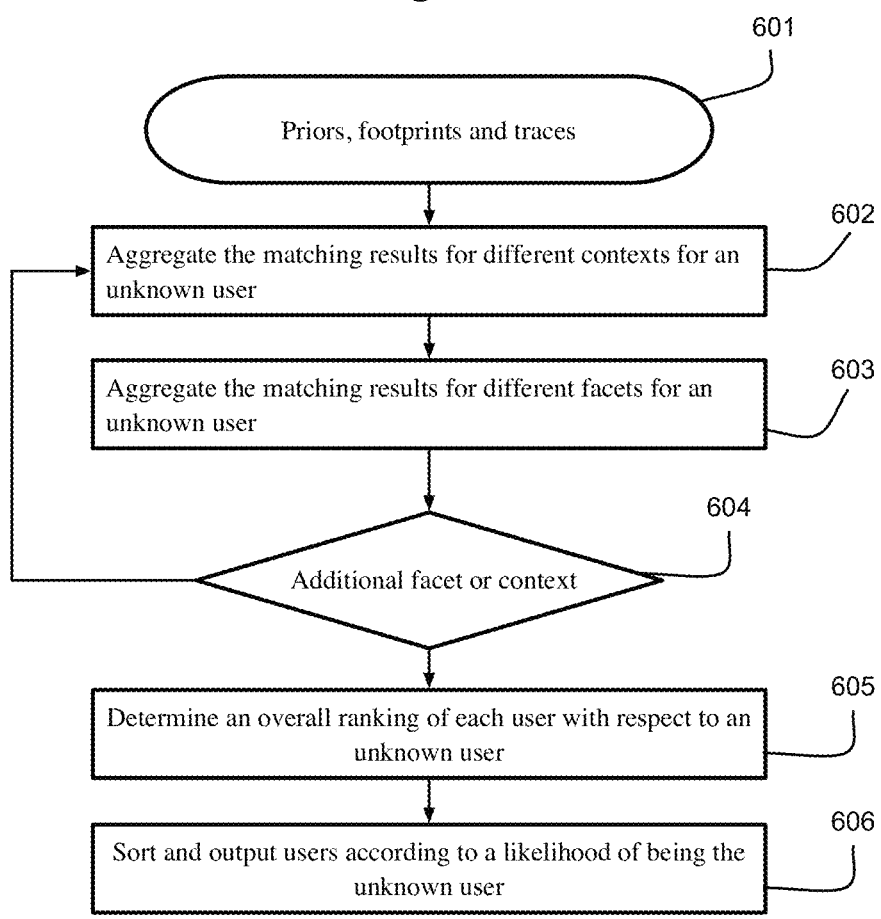
FIG. 6 shows an exemplary a method for footprint matching according to an embodiment of the present disclosure.

According to an embodiment of the present disclosure, a general case may be solved for network traces from multiple facets under multiple contexts. For simplicity, assume that all facets f share the same set of contexts c. Referring to FIG. 6, the input data may be summarized as $\langle u^*, f, c, \{t_c^f\}_{c \in c, f \in f}\rangle$, where $t_c^f$ denotes the measure corresponding to facet f in context c 601.

Using a weighted voting method to aggregate the matching results for different contexts 602 and different facets 603. The aggregation is performed for all facets and contexts 604. More specifically, the overall ranking score of u with respect to $u^*$ is defined as:

$$K(u, u^*) = \frac{\sum_{f \in f}\sum_{c \in c} \pi(f, c)K_c^f(u, u^*)}{\sum_{f' \in f}\sum_{c' \in c} \pi(f', c')} \quad (8)$$

where $\pi(f,c)$ represents the weight of facet f with respect to context c (ensemble prior), satisfying $\pi(f,c) \geq 0$ and $\Sigma_f \Sigma_c \pi(f,c) = 1$ 605. $\pi(f,c)$ may be set in proportion to the performance of the footprint model in attributing the responsible user in a training phase:

$$\pi(f, c) \propto \frac{1}{|\mathcal{T}_c^f|} \sum_{\{u,f,c,t_c^f\} \in \mathcal{T}_c^f} \frac{|U| - K_c^f(u, u) - 1}{|U|}$$

where $|\mathcal{T}_c^f|$ represents the number of tuples in $\mathcal{T}_c^f$ (in cross validation) relevant to f and c. The set of prior parameters π(f,c) are referred to as ensemble prior in FIG. 1.

All the users may then be ranked in the descending order of their ranking scores, indicating their likelihood of being the responsible user 606. An exemplary method of footprint matching may be given as follows:

Input: priors π(f,c), footprints {p(a|u,c)}, and query traces $\langle u*_{,f,c}, \{t_c^f\}_{c \in c, f \in f} \rangle$ Output: ranked list of candidate users
for each facet f∈f and each context c∈c do
while not converged do
determine $\{p(a|t,u*,c)\}_{a \in A, t \in t_c^f}$ as in Eq. (6)
re-estimate $\{p(a|u*,c)\}_{a \in A}$ as in Eq. (7)
end while
determine $\{K_c^f(u, u*)\}_{u \in U}$
end for
determine as $\{K(u,u*)\}_{u \in U}$ in Eq. (8)
sort and output u∈U in ascending order of K(u, u*)

The methodologies of embodiments of the disclosure may be particularly well-suited for use in an electronic device or alternative system. Accordingly, embodiments of the present disclosure may take the form of an entirely hardware embodiment or an embodiment combining software and hardware aspects that may all generally be referred to herein as a "processor", "circuit," "module" or "system." Furthermore, embodiments of the present disclosure may take the form of a computer program product embodied in one or more computer readable medium(s) having computer readable program code stored thereon.

Any combination of one or more computer usable or computer readable medium(s) may be utilized. The computer-usable or computer-readable medium may be a computer readable storage medium. A computer readable storage medium may be, for example but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus or device.

Computer program code for carrying out operations of embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present disclosure are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 7:
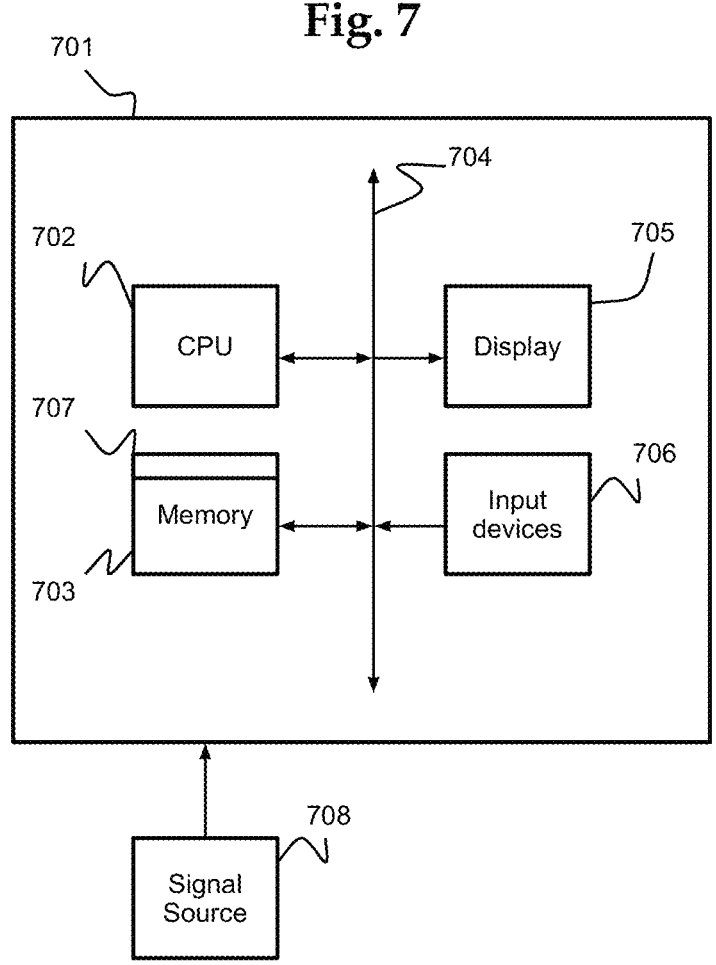
FIG. 7 is a diagram of a computer system for implementing a network trace-based user re-identification according to an embodiment of the present disclosure.

For example, FIG. 7 is a block diagram depicting an exemplary computer system for performing a network trace-based user re-identification method. The computer system 701 may include a processor 702, memory 703 coupled to the processor (e.g., via a bus 704 or alternative connection means), as well as input/output (I/O) circuitry 705-706 operative to interface with the processor 702. The processor 702 may be configured to perform one or more methodologies described in the present disclosure, illustrative embodiments of which are shown in the above figures and described herein. Embodiments of the present disclosure can be implemented as a routine 707 that is stored in memory 703 and executed by the processor 702 to process the signal from the signal source 708. As such, the computer system 701 is a general-purpose computer system that becomes a specific purpose computer system when executing the routine 707 of the present disclosure.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to a multi-core processor that contains multiple processing cores in a processor or more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although illustrative embodiments of the present disclosure have been described herein with reference to the accompanying drawings, it is to be understood that the disclosure is not limited to those precise embodiments, and that various other changes and modifications may be made therein by one skilled in the art without departing from the scope of the appended claims.

What is claimed is:

1. A computer program product for identifying an unknown user, the computer program product comprising:
    a non-transitory computer readable storage medium having computer readable program code embodied therewith, the computer readable program code comprising:
    computer readable program code configured to provide a plurality of historical network traces of user activity;
    computer readable program code configured to extract a footprint for each of a plurality of users from the historical network traces;
    computer readable program code configured to aggregate the footprints of the users to determine an ensemble prior;
    computer readable program code configured to receive a plurality of network traces relevant to an unknown user in a computer environment;
    computer readable program code configured to match the network traces against each of the footprints to determine a plurality of matches;
    computer readable program code configured to aggregate the matches using the ensemble prior according to a plurality of contexts and a plurality of facets; and
    computer readable program code configured to output a probable user identity for the unknown user.

2. The computer program product of 1, wherein the network traces are received as an input stream, and the computer readable storage medium further comprising computer readable program code configured to perform the matching on the stream of network traces using an indexing structure.

3. The computer program product of 1, further comprising computer readable program code configured to output a plurality of user identities, ranked by probability.

4. The computer program of claim 1, wherein outputting further comprises outputting a sorted list of user identifies according to a probability of being the unknown user.

5. The computer program of claim 1, wherein each context indicated at least one of a time and a location of user activity.

6. The computer program of claim 1, wherein each facet is a measurement dimension of user activity.

7. A system for identifying an unknown user according to a plurality of facets of user activity in a plurality of contexts, the system comprising:
    a memory storing a plurality of priors for the facets with respect to the contexts and an ensemble prior based on a plurality of footprints of known users; and
    a processor configured to receive a plurality of network traces relevant to an unknown user in a computer environment, match the network traces against each of the footprints to determine a plurality of matches, aggregate the matches using the ensemble prior according to the facets and the contexts, and output a probable user identity for the unknown user.

8. The system of claim 7, wherein the network traces are received as an input stream, and the method further comprising performing the matching on the stream of network traces using an indexing structure.

9. The system of claim 7, wherein the processor is configured to output a plurality of user identities, ranked by probability.

10. The system of claim 9, wherein outputting further comprises outputting a sorted list of user identifies according to a probability of being the unknown user.

11. The system of claim 9, wherein each context indicated at least one of a time and a location of user activity.

12. The system of claim 9, wherein each facet is a measurement dimension of user activity.

13. The system of claim 9, wherein the memory embodies computer readable program code executed by the processor to identify the unknown user.

* * * * *